United States Patent
Kim

(10) Patent No.: US 9,143,527 B2
(45) Date of Patent: Sep. 22, 2015

(54) APPARATUS AND METHOD PREVENTING OVERFLOW OF PENDING INTEREST TABLE IN NAME BASED NETWORK SYSTEM

(75) Inventor: Dae Youb Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 13/491,683

(22) Filed: Jun. 8, 2012

(65) Prior Publication Data

US 2012/0317643 A1 Dec. 13, 2012

(30) Foreign Application Priority Data

Jun. 9, 2011 (KR) .................. 10-2011-0055480

(51) Int. Cl.
| | | |
|---|---|---|
| H04L 29/06 | (2006.01) | |
| G06F 21/00 | (2013.01) | |
| G06F 15/173 | (2006.01) | |
| H04L 29/08 | (2006.01) | |

(52) U.S. Cl.
CPC ........ *H04L 63/1458* (2013.01); *H04L 63/1441* (2013.01); *G06F 15/173* (2013.01); *G06F 21/00* (2013.01); *H04L 67/327* (2013.01)

(58) Field of Classification Search
CPC ............ H04L 63/1458; H04L 63/1441; H04L 67/327
USPC ............... 726/2, 3, 22, 23; 709/223, 224, 225
See application file for complete search history.

(56) References Cited

U.S. PATENT DOCUMENTS

| | | | |
|---|---|---|---|
| 7,203,190 B1 | 4/2007 | Ruban et al. | |
| 8,826,381 B2 * | 9/2014 | Kim ................................ | 726/3 |
| 2003/0031319 A1 | 2/2003 | Abe et al. | |
| 2006/0130140 A1 * | 6/2006 | Andreev et al. ................. | 726/23 |
| 2007/0115828 A1 * | 5/2007 | Ahuja et al. .................... | 370/236 |
| 2007/0130427 A1 * | 6/2007 | Lahti et al. ..................... | 711/133 |
| 2007/0156594 A1 | 7/2007 | McGucken | |
| 2007/0156988 A1 * | 7/2007 | Ishida et al. ................... | 711/163 |
| 2007/0174912 A1 * | 7/2007 | Kraemer et al. ................ | 726/23 |

(Continued)

FOREIGN PATENT DOCUMENTS

| | | | |
|---|---|---|---|
| KR | 10-2009-0037962 A | 4/2009 | |
| KR | 10-2010-0088562 A | 8/2010 | |

(Continued)

OTHER PUBLICATIONS

Jacobson et al. "Networking Named Content". Dec. 2009. CoNEXT '09. pp. 1-12.*

(Continued)

*Primary Examiner* — Sarah Su
(74) *Attorney, Agent, or Firm* — NSIP Law

(57) ABSTRACT

A node apparatus and method are described to prevent overflow of a pending interest table (PIT) in a name based network system. The node apparatus and method increases a number of PITs to correspond to a number of interface units so that the PITs match the interface units, respectively, and stores a request message flowing in per interface unit in the matching PITs. In addition, when a capacity used at each of the PITs exceeds a threshold, the node apparatus and method transmits a traffic control message for traffic control through respectively matching interface units to prevent overflow of the PITs.

19 Claims, 4 Drawing Sheets

(56) References Cited

U.S. PATENT DOCUMENTS

| | | |
|---|---|---|
| 2009/0262741 A1 | 10/2009 | Jungck et al. |
| 2009/0291685 A1* | 11/2009 | Morimoto ..................... 455/436 |
| 2009/0293123 A1* | 11/2009 | Jackson et al. ................. 726/23 |
| 2010/0063873 A1 | 3/2010 | McGucken |
| 2010/0122344 A1* | 5/2010 | Wei et al. ........................ 726/23 |
| 2010/0195655 A1* | 8/2010 | Jacobson et al. .............. 370/392 |
| 2010/0322249 A1* | 12/2010 | Thathapudi et al. ....... 370/395.1 |
| 2011/0055921 A1* | 3/2011 | Narayanaswamy et al. .... 726/22 |
| 2011/0280214 A1* | 11/2011 | Lee et al. ....................... 370/331 |
| 2012/0287939 A1* | 11/2012 | Leu et al. ....................... 370/409 |
| 2012/0317307 A1* | 12/2012 | Ravindran et al. ............ 709/238 |
| 2012/0317616 A1* | 12/2012 | Kim ................................. 726/3 |
| 2013/0060962 A1* | 3/2013 | Wang et al. ................... 709/238 |
| 2014/0222891 A1* | 8/2014 | Ko et al. ........................ 709/203 |
| 2014/0351929 A1* | 11/2014 | Mahadevan et al. ............ 726/22 |

FOREIGN PATENT DOCUMENTS

| | | | |
|---|---|---|---|
| WO | WO 2007-056841 A1 | 5/2007 | |
| WO | WO 2009139170 A1 * | 11/2009 | ............. G06F 13/38 |

OTHER PUBLICATIONS

European Extended Search Report issued Dec. 18, 2012 in counterpart European Patent Application No. 12171164.2-1244/2533495 (9 pages, in English).

Zhang, Lixia et al. "Named Data Networking (NDN) Project," NDN, Technical Report NDN-0001, Oct. 2010. http://named-data.net/techreports.html XP-002687393 (26 pages, in English).

Hechinger, Brandon. "Network Protocol Fix," XP-002687394, Jul. 30, 2003 (1 page, in English).

* cited by examiner

APPARATUS AND METHOD PREVENTING OVERFLOW OF PENDING INTEREST TABLE IN NAME BASED NETWORK SYSTEM

CROSS-REFERENCE TO RELATED APPLICATION(S)

This application claims the benefit under 35 U.S.C. §119(a) of Korean Patent Application No. 10-2011-0055480, filed on Jun. 9, 2011, in the Korean Intellectual Property Office, the entire disclosure of which is incorporated herein by reference.

BACKGROUND

1. Field

The following description relates to a technology for routing in a node device of a name based network system.

2. Description of Related Art

In a network routing technology, such as a content centric network/named data network (CCN/NDN), it is necessary to know of a target place to retransmit a response message, which respond to a request message when the response message is returned to be processed. In a name based networking, such as CCN/NDN, the request message may also be referred to as a request, an interest, or a data request. Also, the response message may be called a response or data.

A pending interest table (PIT) refers to a table that stores a list of received request messages. That is, when a request message is received, a corresponding node device records a traffic path along with information on the request message in the PIT. Upon return of a corresponding response message, the corresponding node device retransmits the corresponding response message to the traffic path of the request message stored in the PIT.

However, the PIT may be a target of a distributed denial of service (DDoS) attack. That is, when a quantity of request messages received exceeds the capacity of the PIT of the node device, the node device has to delete part of the recorded information or discard newly received request messages. Regardless of whether to delete recorded information or discarding newly received request messages, the DDoS attack will eventually be successful because the node device is hindered from normally processing the request messages.

A general Internet protocol (IP) router does not require management of a traffic history. Therefore, a DDos attack scenario, as described above, is not applicable to the IP router. However, in networks, such as the CCN/NDN, where devices are not identified, the PIT functions as essential information for the networking. Thus, the node device corresponding to the router in the name based network system is vulnerable to the DDos attack.

SUMMARY

In accordance with an illustrative configuration, a node device includes interface units configured to receive a request message from a name based network, and pending interest tables (PITs) configured to store the request message. The PITs match the interface units, respectively. The node device also includes a control unit configured to identify an interface unit that received the request message when one of the interface units received the request message, and identify one of the PITs matching the identified interface unit to control the identified PIT to store the request message.

In accordance with another example, a method is described including receiving a request message generated from a name based network at interface units, and identifying the interface unit of the interface units that received the request message. The method also includes identifying a pending interest table (PIT) of pending interest tables (PITs) that corresponds to the identified interface unit, and storing the request message in the identified PIT to prevent overflow of a pending interest table (PIT) in a node device.

In accordance with an alternative example, an apparatus including pending interest tables (PITs) configured to receive and store a request message received, and a control unit configured to identify an interface unit receiving the request message and identify a PIT from the PITs corresponding to the identified interface unit, and configured to control the identified PIT to store the request message to prevent overflow of the identified PIT Other features and aspects will be apparent from the following detailed description, the drawings, and the claims.

Figure 1:
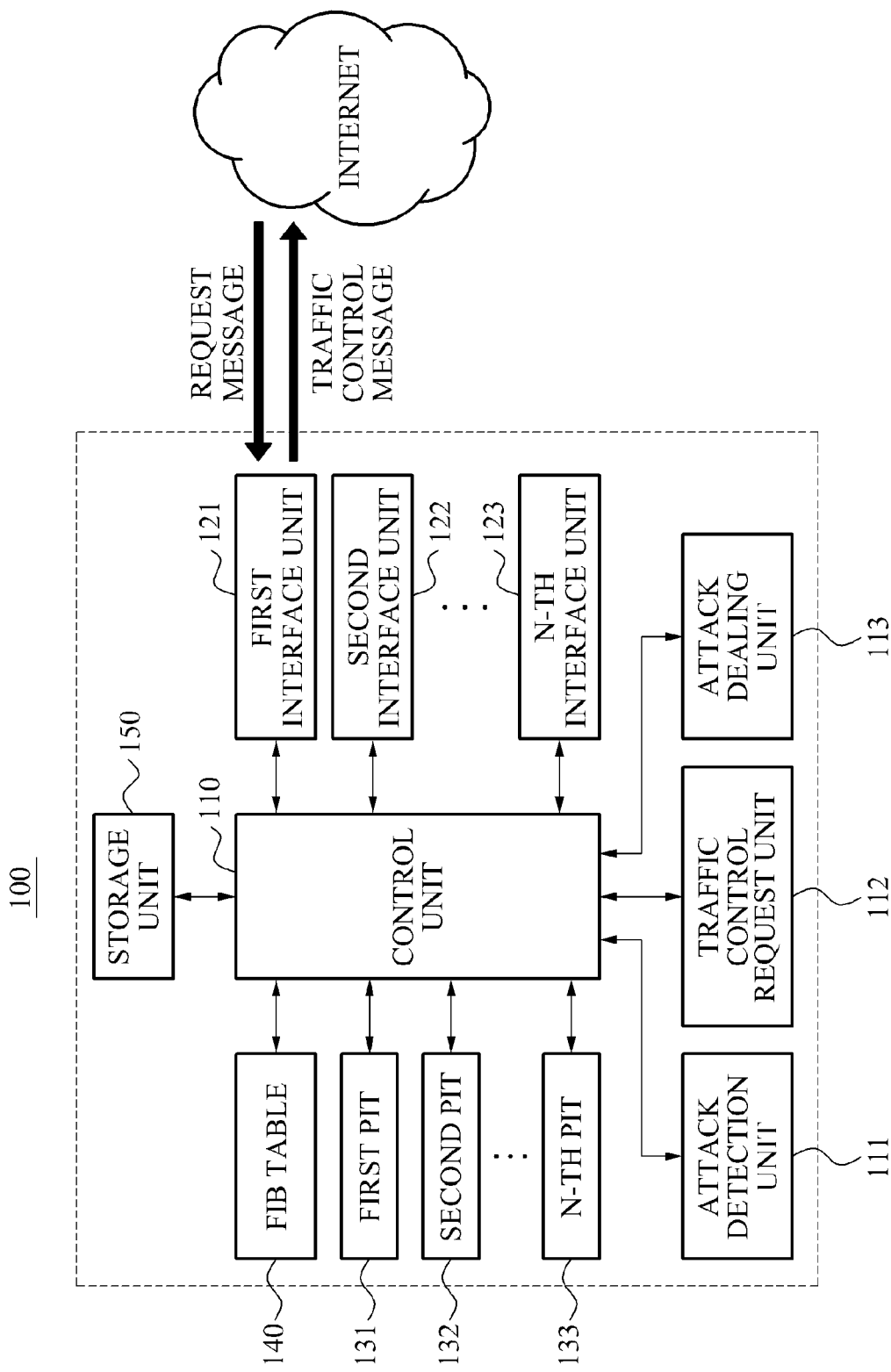
FIG. 1 is a diagram illustrating a structure of a node device that prevents overflow of a pending interest table (PIT), according to an illustrative example.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art.

According to various examples, an apparatus and method are provided to prevent an overflow of a pending interest table (PIT). A node device is configured to increase a number of PITs to correspond to a number of interface devices or units. The node device is also configured to store a request message flowing in per interface unit in the PITs. Because the request message is stored in the PIT that matches or corresponds to each interface unit, respectively, damage may be minimized if an attack occurs. In addition, when a capacity used at each PIT exceeds a threshold, the node device may transmit a traffic control message through each matching interface unit, thereby controlling quantity of the request message flowing in.

FIG. 1 illustrates a structure of a node device 100 that prevents overflow of a pending interest table (PIT), according to an illustrative example.

Referring to FIG. 1, the node device 100 includes a control unit 110, an attack detection unit 111, a traffic control request unit 112, an attack managing unit 113, and interface units 121, 122, and 123. The control unit 110 also includes a plurality of PITs, for example, PITs 131, 132, and 133, and a forwarding information base (FIB) table 140, and a storage unit 150.

The interface units 121, 122, and 123 may receive a request message controlled by the control unit 110, and transmit the received request message. Also, the interface units 121, 122, and 123 may transmit a traffic control message controlled by the control unit 110.

Here, the interface units 121, 122, and 123 may be a logic interface, that is, a virtual interface, or a physical interface. Although in FIG. 1, each interface unit 121, 122, and 123 is labeled as a first, second, and n-th interface unit, such labels are used for the sole purpose of distinguishing between interface units. The terms "first," "second," and "n-th" may refer to a particular order of the interface units in an illustrative configuration. In another illustrative configuration, these terms may not refer to a particular order but may be used simply to differentiate or distinguish between interface units.

The PITs 131, 132, and 133 may store the request message received from the interface units 121, 122, and 123, respectively, controlled by the control unit 110. As shown in FIG. 1, the request message may be received from the Internet and a traffic control message may be transmitted back to the Internet. Although in FIG. 1, each PIT 131, 132, and 133 is labeled as a first, second, and n-th PIT, such labels are used for the sole purpose of distinguishing between PITs. The terms "first," "second," and "n-th" may refer to a particular order of the PITs in an illustrative configuration. In another configuration, these terms may not refer to a particular order but may be used to differentiate or distinguish between PITs.

Figure 2:
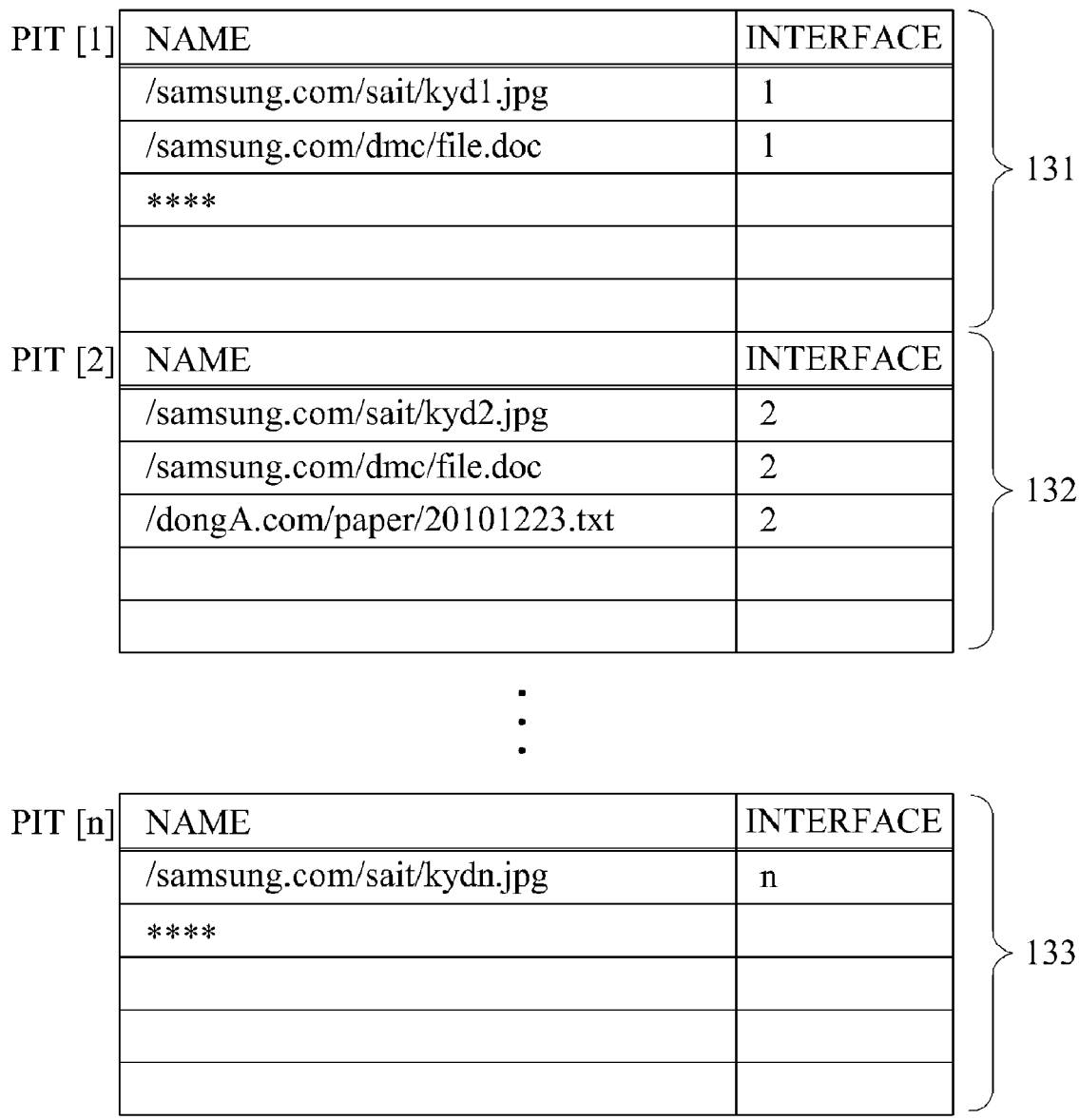
FIG. 2 is a diagram illustrating a structure of a plurality of PITS, according to an illustrative example.

FIG. 2 illustrates a structure of a plurality of PITs, according to an illustrative example.

Referring to FIG. 2, the plurality of PITs, for example, PITs 131, 132, and 133 may store a name of the request message along with information from one of the interface units 121, 122, and 123 that received the request message. The information may include, but is not limited to, interface information. Because each of the PITs 131, 132, and 133 may be associated with one of the interface units, 121, 122, and 123, respectively, the received interface information may be dispensable.

In one configuration, the PITs 131, 132, and 133 may have all the same capacity or different respective capacities. For example, the capacities of the PITs 131, 132, and 133 may be set in as a function traffic flowing into the corresponding interface units.

By way of example, the PITs 131, 132, and 133 may be physically different tables. In one example, at least one of the PITs 131, 132, and 133 may be logically divided into a virtually divided table. For example, one PIT may be logically divided using counters of the interface units 121, 122, and 123.

The FIB table 140 may store names of request messages and corresponding interface information.

The storage unit 150 may store an operation system and an application program to control the overall operation of the node device 100. In addition, the storage unit 150 may also store authentication information of the node device 100 to authenticate the node device 100.

When receiving the request message through the interface units 121, 122, and 123, the control unit 110 may control the PITs 131, 132, and 133 to store the request message. When the request message is received through one of the interface units 121, 122, and 123, the control unit 110 may identify the interface unit 121, 122, and 123 that receives the request message. In addition, the control unit 110 may identify one of the PITs 131, 132, and 133 matching the identified interface unit, and may control the identified PIT to store the request message. For example, the control unit 110 may control the PIT 131 to store the request message received through the first interface unit 121.

The control unit 110 may search for a name substantially similar with, same as, matching, or equivalent to the request message from the FIB table 140, and may check the interface units 121, 122, and 123 to determine which interface unit 121, 122, or 123 corresponds to the searched name. In one configuration, with the request message from the FIB table 140, the control unit 110 may simultaneously check all of the interface units 121, 122, and 123. In another configuration, with the request message from the FIB table 140, the control unit 110 may sequentially check the interface units 121, 122, and 123. In further another configuration, the control unit 110 may use the FIB table 140 to randomly check the interface units 121, 122, and 123. The control unit 110 may transmit the received request message through the interface unit 121, 122, and/or 123 corresponding to the searched name using the FIB table 140.

The attack detection unit 111 may check the capacity stored in the identified PIT 131, 132, and/or 133, and detect whether the stored capacity exceeds a predetermined threshold. When the capacity stored in the identified PIT 131, 132, and/or 133 exceeds the predetermined threshold, the attack detection unit 111 may detect an attack through the interface unit matching the identified PIT. In one illustrative example, the PITs 131, 132, and 133 all may apply the same predetermined threshold or respectively different thresholds. In one configuration, each threshold may be set in consideration of or as a function of traffic flowing into the interface units respectively matching the PITs 131, 132, and 133.

In addition, the thresholds may be varied according to a location of the node device 100 in a network topology. For example, a node device located at an end of the network may receive relatively less traffic than a node device located at a center of the network. In one example, the threshold of the node device located at the end of the network may be set less than the threshold of the node device located in the center of the network.

The traffic control request unit 112 may transmit the traffic control message to the interface unit detected by the attack detection unit 111. In one example, the traffic control message may request control of a transmission interval of the request message.

The traffic control message may contain authentication information to identify and authenticate the node device 100. The traffic control message may further contain at least one of hop number information, maintenance time information, and transmission interval information. The hop number information may indicate a number of nodes to transmit the traffic control message. The maintenance time information may indicate a period of time during which traffic control is maintained by the traffic control message. The transmission interval information may indicate the transmission interval of the request message.

After the traffic control request unit 112 transmits the traffic control message, the request messages are received through the interface unit 121, 122, or 123 detecting the attack. The request messages may be received at a shorter interval than a transmission interval set by the traffic control message. The attack managing unit 113 may then discard the request messages received at the shorter interval than the set transmission interval. For example, the attack managing unit 113 may discard the request messages received at a transmission interval other than the transmission interval set through the interface unit where traffic is controlled.

The traffic control request unit 112 may transmit the traffic control message to all interface units 121, 122, and 123. When the traffic control request unit 112 transmits the request message to all the interface units 121, 122, and 123, the attack managing unit 113 may discard the request messages received at a shorter interval than transmission intervals each of the interface units 121, 122, and 123 requested.

The control unit 110 may control the overall operation of the node device 100. In accordance with an illustrative example, although the aforementioned parts are separately illustrated in the drawings for a distinctive description, the control unit 110 may perform functions of the attack detection unit 111, the traffic control request unit 112, and the attack managing unit 113. In other words, the control unit 110 may include at least one processor configured to perform the functions of the attack detection unit 111, the traffic control request unit 112, and the attack managing unit 113. In addition, the control unit 110 may include at least one processor configured to perform part of the functions of the attack detection unit 111, the traffic control request unit 112, and the attack managing unit 113.

As described below, a description is provided for a method to prevent overflow of the PITs 131, 132, and 133 in the above described node device 100 in a name based network system.

The units described with respect to FIGS. 1 and 2 may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Figure 3:
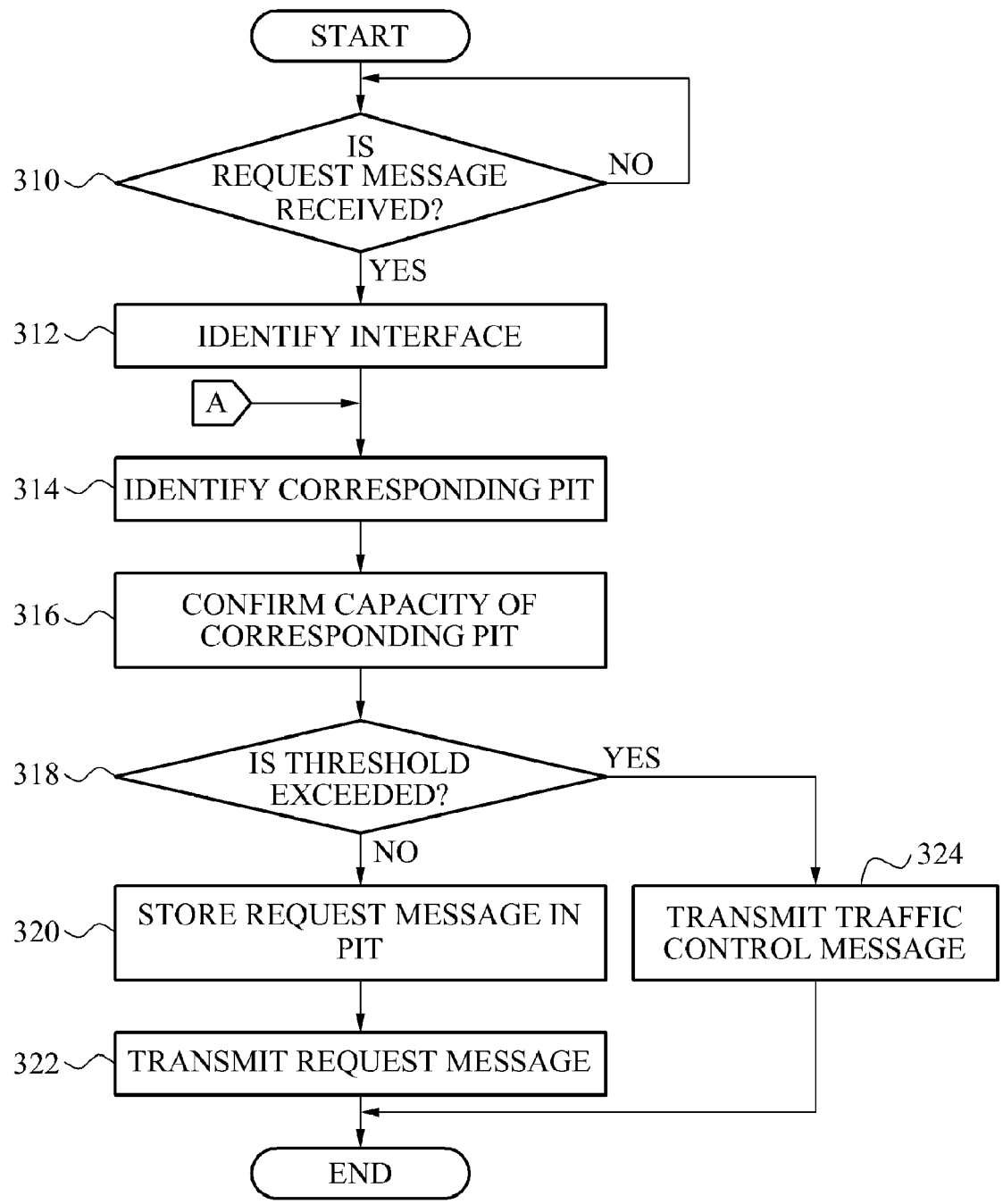
FIG. 3 is a flowchart illustrating a method of distributing and storing request messages in a plurality of PITs in a node device, according to an illustrative example.

FIG. 3 illustrates a flowchart describing a method or a process of distributing and storing request messages in a plurality of PITs in a node device, according to an illustrative example.

At 310, the method determines whether a request message is received at the node device. When the method determines that the request message is received, the method proceeds to 312. At 312, the method identifies at the node device an interface unit that received the request message. At 314, method identifies a PIT corresponding to the identified interface unit.

At 316, the node device checks a capacity used at the identified PIT. At 318, the method for the node device checks whether the capacity used at the PIT exceeds a predetermined threshold. When the method determines that the capacity used at the PIT is equal to or below the predetermined threshold, the method proceeds to 320. At 320, the node device stores the received request message in the identified PIT.

At 322, the method searches for a name similar to or, in the alternative, matching the received request message from an FIB table, checks an interface unit corresponding to the searched name, and transmits the received request message through the checked interface unit.

When the method determines that the capacity used at the PIT exceeds the predetermined threshold, the method proceeds to 324. At 324, the method for the node device transmits a traffic control message to the identified interface unit. In one example, the response message may request control of a transmission interval of the request message. The traffic control message may contain authentication information for identifying and authenticating the node device. For example, the traffic control message may contain at least one of hop number information, maintenance time information, and transmission interval information.

Figure 4:
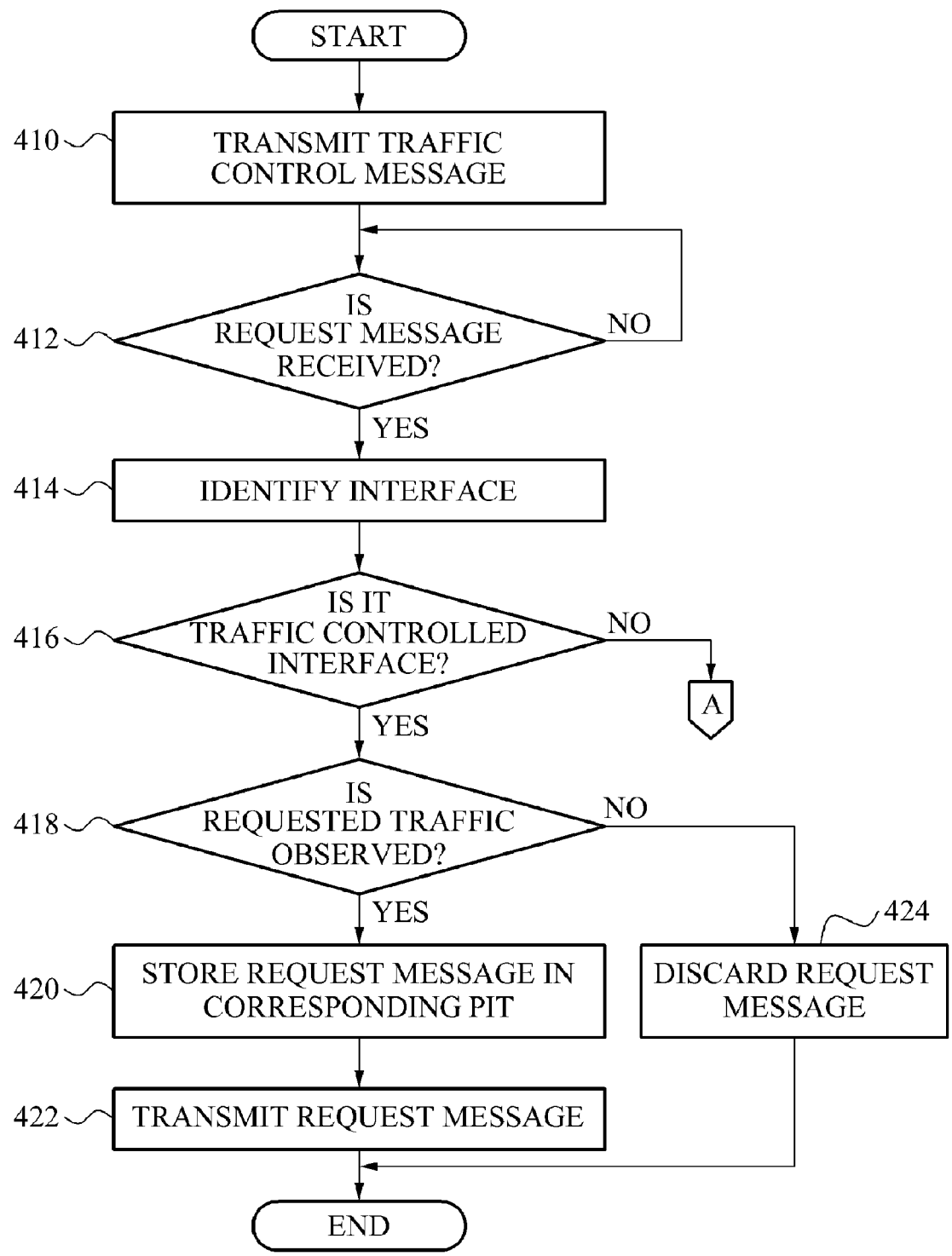
FIG. 4 is a flowchart illustrating a method of dealing with an attack in a node device, according to an illustrative example.

FIG. 4 illustrates a flowchart describing a method or a process of dealing with an attack in a node device, according to an illustrative example.

Referring to FIG. 4, at 410, the method at the node device transmits a traffic control message. At 412, the method at the node device receives a request message in 412. At 414, the method identifies an interface unit that received the request message.

At 416, the method checks whether the identified interface unit is an interface unit where traffic is controlled. When the method determines at 416 that the identified interface unit is not the interface unit where traffic is controlled, the method performs 314 of FIG. 3 (shown as "A" in FIGS. 3 and 4).

When the method determines at 416 that the identified interface unit is the interface unit where traffic is controlled, at 418, the method at the node device checks whether traffic requested by the traffic control message is observed. Here, when the request messages are received at a shorter interval than a requested transmission interval from the interface unit, to which the traffic control message is transmitted, the method at the node device may determine that the requested traffic is not observed.

When the method determines at 418 that the requested traffic is observed, the method stores the received request message in a PIT corresponding to the identified interface unit, in 420.

In addition, at 422, the method at the node device searches for a name having a high similarity with the received request message from an FIB table, checks an interface unit corresponding to the searched name, and transmits the received request message through the checked interface unit.

When the method determines at 418 that the requested traffic is determined to be not observed as a result, at 424, the method at the node device discards the request messages received outside the requested transmission interval.

It is to be understood that in the embodiment of the present invention, the operations in FIGS. 3 and 4 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIGS. 3 and 4.

Program instructions to perform a method described in FIGS. 3 and 4, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

Although example embodiments have been shown and described, it would be appreciated by those skilled in the art that changes may be made in these example embodiments without departing from the principles and spirit of the disclosure, the scope of which is defined in the claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A node device comprising:
   interface units configured to receive a request message from a name based network;
   pending interest tables (PITs) configured to store the request message, each of the PITs matching a respective interface unit;
   a control unit configured to identify one of the interface units receiving the request message, identify the PIT matching the identified interface unit, and control the identified PIT to store the request message; and
   an attack detection unit configured to determine a capacity used at the identified PIT and detect an attack through the identified interface unit based on the determined capacity, wherein the attack detection unit is configured to detect whether the determined capacity exceeds a predetermined threshold; and
   a traffic control request unit configured to transmit a traffic control message to the identified interface unit when the attack detection unit detects the determined capacity exceeding the predetermined threshold, the traffic control message requesting control of a transmission interval of request messages.

2. The node device of claim 1, wherein a capacity of each of the PITs is set as a function of traffic flowing into the PIT.

3. The node device of claim 1, wherein the traffic control message comprises authentication information to identify and authenticate the node device.

4. The node device of claim 3, wherein the traffic control message further comprises at least one of:
   hop number information indicating a number of nodes transmitting the traffic control message,
   maintenance time information indicating time during which traffic control by the traffic control message is maintained, and
   transmission interval information indicating the transmission interval of the request messages.

5. The node device of claim 1, further comprising an attack managing unit configured to discard request messages received at a transmission level other than a transmission interval requested by the traffic control request unit, when the request messages are received at a shorter interval than the requested transmission interval and after the traffic control message is transmitted.

6. The node device of claim 1, wherein the traffic control request unit transmits the traffic control message to all of the interface units.

7. The node device of claim 6, further comprising an attack managing unit configured to discard request messages received at a transmission level other than a transmission interval requested by the traffic control request unit, when the request messages are received at a shorter interval than the requested transmission interval and after the traffic control message is transmitted to the interface units.

8. A method comprising:
   receiving a request message generated from a name based network at interface units;
   identifying one of the interface units that received the request message;
   identifying, among pending interest tables (PITs), a PIT that corresponds to the identified interface unit;
   storing the request message in the identified PIT to prevent overflow of the identified PIT, which is disposed in a node device; and
   attack-detecting to determine a capacity used at the identified PIT and detect an attack through the identified interface unit based on the determined capacity, wherein the attack-detecting detects whether the used capacity exceeds a predetermined threshold; and
   transmitting a traffic control message to the identified interface unit when the attack-detecting detects that the capacity used at the PIT exceeds the predetermined threshold, the traffic control message requesting control of a transmission interval of request messages.

9. The method of claim 8, wherein each of the PITs matches a respective interface unit.

10. The method of claim 9, wherein capacity of each of the PITs is set as a function of traffic flowing into each matching interface unit.

11. The method of claim 8, wherein the traffic control message comprises authentication information to identify and authenticate the node device.

12. The method of claim 11, wherein the traffic control message comprises:
   hop number information indicating a number of nodes transmitting the traffic control message;
   maintenance time information indicating time during which traffic control by the traffic control message is maintained; and
   transmission interval information indicating the transmission interval of the request messages.

13. The method of claim 8, further comprising discarding request messages received at a transmission level other than the requested transmission interval when the request messages are received at a shorter interval than the requested transmission interval, after the transmitting of the traffic control message.

14. The method of claim 8, wherein the transmitting of the traffic control message transmits the traffic control message to all the interface units.

15. The method of claim 14, further comprising discarding request messages received at a transmission level other than the requested transmission interval, when the request messages are received at a shorter interval than the requested transmission interval, after the transmitting of the traffic control message.

16. An apparatus comprising:
pending interest tables (PITs) configured to store a request message received from a name based network;
a control unit configured to identify one of interface units receiving the request message, identify a PIT, from the PITs, corresponding to the identified interface unit, and control the identified PIT to store the request message to prevent overflow of the identified PIT; and
an attack detection unit configured to determine a capacity used at the identified PIT and detect an attack through the identified interfaced unit based on the determined capacity, wherein the attack detection unit is configured to detect whether the determined capacity exceeds a predetermined threshold; and
a traffic control request unit configured to transmit a traffic control message to the identified interface unit when the attack detection unit detects the determined capacity exceeding the predetermined threshold, the traffic control message requesting control of a transmission interval of request messages.

17. The apparatus of claim 16, further comprising a forwarding information base (FIB) table configured to store names of request messages and corresponding interface information.

18. The apparatus of claim 16, wherein:
when the determined capacity exceeds the predetermined threshold, the attack detection unit detects an attack through the interface unit corresponding to the identified PIT, and
the predetermined threshold is set based on traffic flowing into the interface units or according to a location of the apparatus.

19. The apparatus of claim 16, further comprising:
wherein the traffic control message comprises at least one of authentication information to identify and authenticate the node device, hop number information, maintenance time information, and transmission interval information.

* * * * *